United States Patent [19]

Ruiz

[11] Patent Number: 6,098,955
[45] Date of Patent: Aug. 8, 2000

[54] VALVE ARRANGEMENT FOR THE DELIVERY OF FLUIDS

[75] Inventor: Jesus Ruiz, Le Mont-sur-Lausanne, Switzerland

[73] Assignee: SICPA Holding S.A., Prilly, Switzerland

[21] Appl. No.: 09/147,656
[22] PCT Filed: Jun. 12, 1998
[86] PCT No.: PCT/EP98/03541
  § 371 Date: Feb. 9, 1999
  § 102(e) Date: Feb. 9, 1999
[87] PCT Pub. No.: WO98/58200
  PCT Pub. Date: Dec. 23, 1998

[30] Foreign Application Priority Data

Jun. 16, 1997 [EP] European Pat. Off. .............. 97810379

[51] Int. Cl.[7] ................................ F16K 1/36; F16K 1/52
[52] U.S. Cl. ........................................ 251/120; 251/356
[58] Field of Search ..................... 251/120, 118, 251/356; 138/43, 45, 46

[56] References Cited

U.S. PATENT DOCUMENTS 1,891,374  12/1932  Ehemann ................................ 251/120
3,753,547  8/1973  Topham .................................. 251/120

FOREIGN PATENT DOCUMENTS 575089  4/1976  Switzerland .......................... 251/120

*Primary Examiner*—Kevin Lee
*Attorney, Agent, or Firm*—Shoemaker and Mattare, Ltd.

[57] ABSTRACT

A valve arrangement includes a valve housing and a closing element movably arranged within the housing. The housing has a cylindrical bore a lateral inlet opening, an axial outlet opening, and a valve seat arranged axially at a distance away from the inlet opening. The closing element includes a sealing section adapted to seat against a valve seat so as to block fluid flow through the outlet, and tapered portion which defines a rotationally symmetrical circumferential distribution space between itself and the bore.

4 Claims, 2 Drawing Sheets

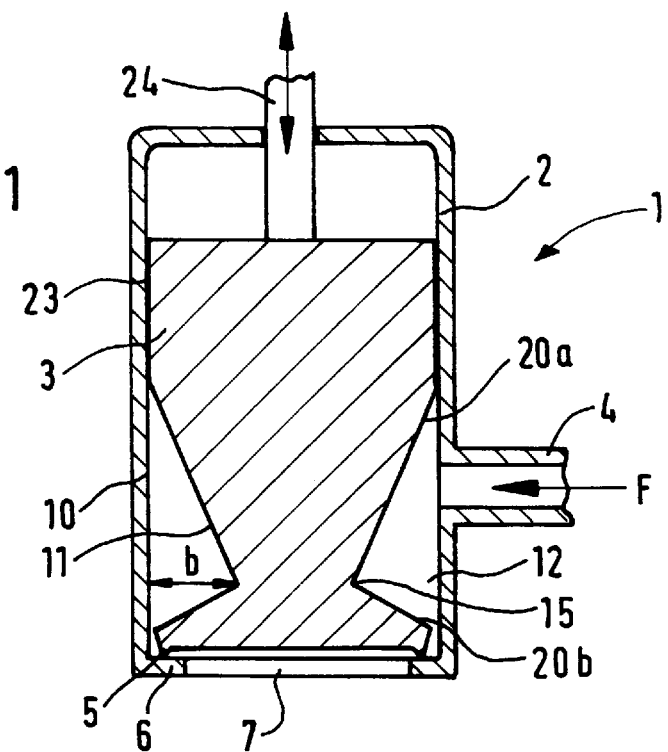
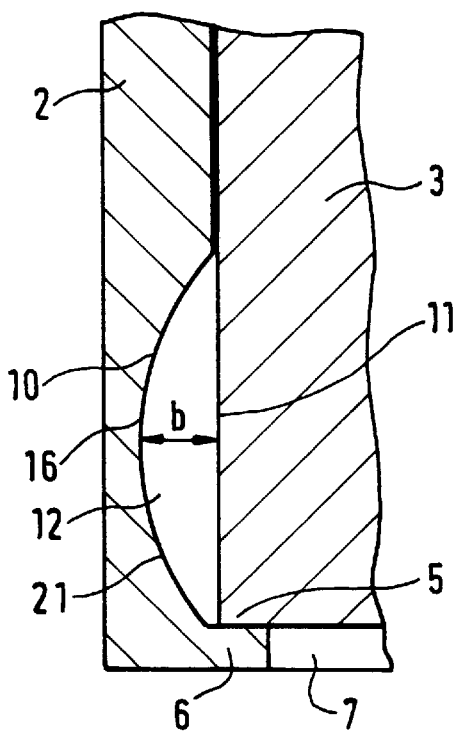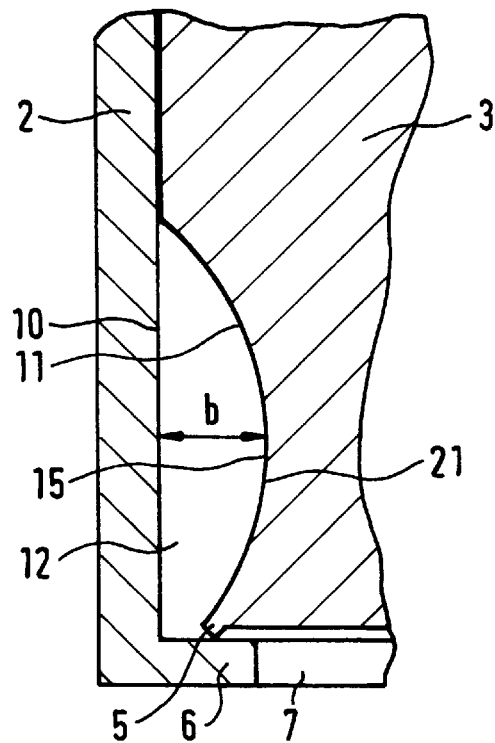

VALVE ARRANGEMENT FOR THE DELIVERY OF FLUIDS

The invention relates to a valve arrangement for the delivery of fluids.

BACKGROUND OF THE INVENTION

For the temporary closing off or throttling of a gas, vapour or fluid flow, a multitude of different types of valves are known. It is for instance differentiated between straight-way valves with a linear fluid flow, corner valves with a bent flow and shuttle valves. In many areas of application, highly viscous fluids, for some part under pressure, are led through the valves. In spite of the high viscosity, the gas, vapour or fluid flow delivered from the valve should run as uniformly as possible. Particularly with valves in which a change in direction of the fluid flow is effected, it is difficult to achieve such a uniform delivery. With the valve closed, the fluid to be delivered presses laterally on a closing element, for example on a valve lifter. As soon as the closing element is moved away and thus the valve is opened, the fluid is delivered. When the highly viscous fluid enters laterally under pressure into the valve, it is often not possible for a delivery of the fluid in a straight jet. Depending on pressure and viscosity of the fluid, there results a deviation of the jet. The above mentioned problems are present for example with highly viscous fluids such as printing inks.

SUMMARY OF THE INVENTION

It is the object of the present invention to avoid the disadvantages of that which is known, in particular to provide a valve arrangement for the delivery of fluids, by way of which the delivery also of highly viscous fluids is possible in a uniform jet. A further object of the present invention lies in providing a valve arrangement which can be simply and cheaply produced and which is composed of as little as possible moving parts. The device according to the invention is also to be able to be cleaned in a simple manner.

U.S. Pat. No. 3,286,736 discloses a valve for use with viscous liquids which comprises a cylindrical distribution space in which a closing element having a conical sealing surface is displaceably arranged.

According to the invention, these objects are achieved with a valve arrangement with the features of claim 1.

The valve arrangement having the features of the invention consists essentially of a valve housing and a closing element movably arranged in the valve housing. The valve housing is provided with a lateral inlet opening and an axial outlet opening. The outlet opening can be closed with a sealing section of the closing element in a valve seat of the valve housing. The valve seat is arranged axially at a distance to the inlet opening. So that a uniform delivery of also a highly viscous fluid, where appropriate under pressure, is made possible, between the valve seat and the inlet opening there is provided a circumferential distribution space which at least with a closed valve arrangement, is in connection with the inlet opening. In this context, highly viscous fluids are to be understood as fluids such as printing inks of which the viscosity is typically more than 2 Pa·s. On the one hand the distribution space is limited by the inner surface of the valve housing and on the other hand by the outer surface of the closing element. When the valve is closed, the fluid fills the circumferential distribution space so that a uniform pressure prevails in the whole circumference of the closing element. As soon as the sealing section of the closing element is brought out of engagement with the valve seat, the fluid collected in the distribution space leaves the valve. Due to the homogeneous pressure distribution of the fluid in the distribution space, the delivery is effected uniformly.

The closing element is preferably axially displaceably mounted in the valve housing. Other arrangements however are also conceivable, for example a rotatable closing element, which by rotation opens or closes holes for the delivery of the fluid.

In a particularly advantageous embodiment example, the width of the distribution space continually reduces from a point of maximum width towards the outlet opening. With such a continuous reduction, a particularly homogeneous distribution of the delivered fluid jet may be achieved. The distribution space further advantageously extends up to or nearly up to the valve seat up to the sealing section of the closing element.

The distribution space is limited on the one hand by the outer surface of the closing element and on the other hand by the inner surface of the valve housing. For forming a distribution space, it is also conceivable to provide the outer surface of the closing element with a necking and/or the inner surface of the valve housing with an indentation. Both the embodiment examples are similar in their operative manner. The homogeneity of the delivered fluid jet is additionally increased by this. As a rule, any rotationally symmetrical arrangement is conceivable. It has been established that an arrangement with cone sections standing on one another, or with a curved surface of revolution like a paraboloid of revolution, or with a section of a spherical surface are particularly advantageous. Such surfaces permit a uniform discharge of the fluid over the surfaces concerned.

BRIEF DESCRIPTION OF THE DRAWINGS

The invention is hereinafter described in more detail by way of embodiment examples and the drawings. There are shown:

FIG. 1 a schematic representation, in cross section, of a valve arrangement according to the invention, with the valve closed, FIG. 2 the arrangement according to FIG. 1 with the valve open, FIGS. 3 and 4 alternative embodiment examples of the distribution space, and FIG. 5 a valve arrangement according to the state of the art.

DESCRIPTION OF THE PREFERRED EMBODIMENT

Figure 5:
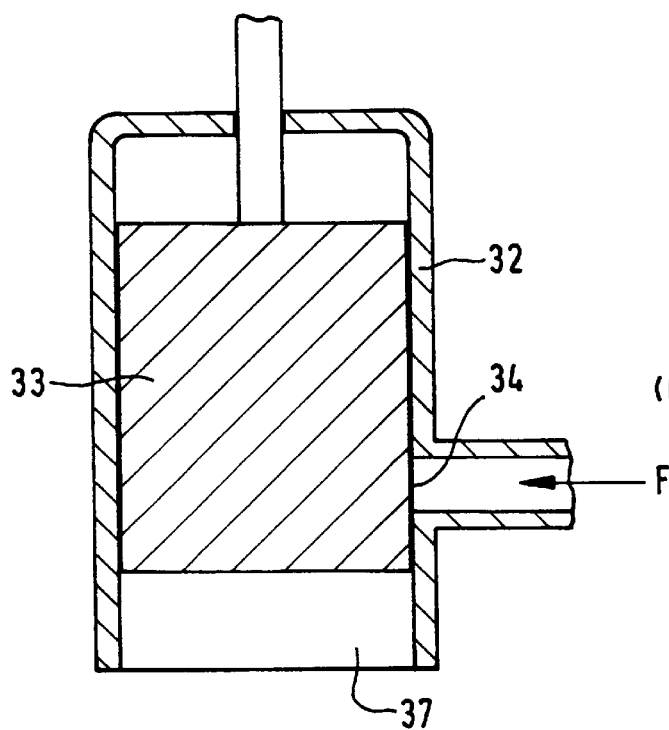

A valve arrangement known from the state of the art is schematically shown in FIG. 5. A valve housing 32 is provided with a lateral inlet opening 34 which can be closed by a closing element 33 axially displaceable in the valve housing 32. In the closed condition shown in FIG. 5, the fluid F presses against the outer surface of the closing element 33. For opening the valve arrangement, the closing element 33 is lifted and releases the inlet opening 34. The fluid F may enter into the inside of the valve housing 32 and is delivered by way of the outlet opening 37. Due to the pressure, the fluid F receives a lateral component, so that the fluid does not exit the outlet opening 37 parallel to the axis of the valve, but diagonally.

The valve arangement 1 according to the invention which is shown in FIG. 1 does not have these disadvantages. The valve arrangement 1 consists likewise of a valve housing 2 and in this, an axially displaceable closing element 3. The closing element 3 comprises a sealing section 5 by way of which said closing element presses against a valve flat annular seat 6 and thus closes an outlet opening 7.

A highly viscous fluid F with a viscosity of $\geq 2$ Pa·s can be introduced into the inside of the valve housing 2 by way of an inlet opening 4. In direct connection with the inlet opening 4 is a circumferential distribution space 12, in which the fluid F collects with the valve closed. The circumferential distribution space 12 on the one side is limited by the inner surface 10 of the valve housing 2 and on the other side by the outer surface 11 of the closing element 3. The outer surface 11 of the closing element comprises a necking 15 which defines the maximum width b of the distribution space 12. In the embodiment example shown in FIG. 1, the necking 15 is defined by the intersection point of two cone sections 20a, 20b standing on one another. The cone sections 20a, 20b form the outer surface 11 of the closing element 3 in the region of the distribution space 12.

In an upper section 23, the closing element 3 slides sealingly in the valve housing 2. The closing element 3 is movable in the axial direction by way of a drive arrangement 24 which is not shown in more detail. This may concern a manual, a motor or pneumatic drive. For opening the valve arrangement 1, the closing element 3 is lifted in the axial direction by way of the drive arrangement 24.

Figure 2:
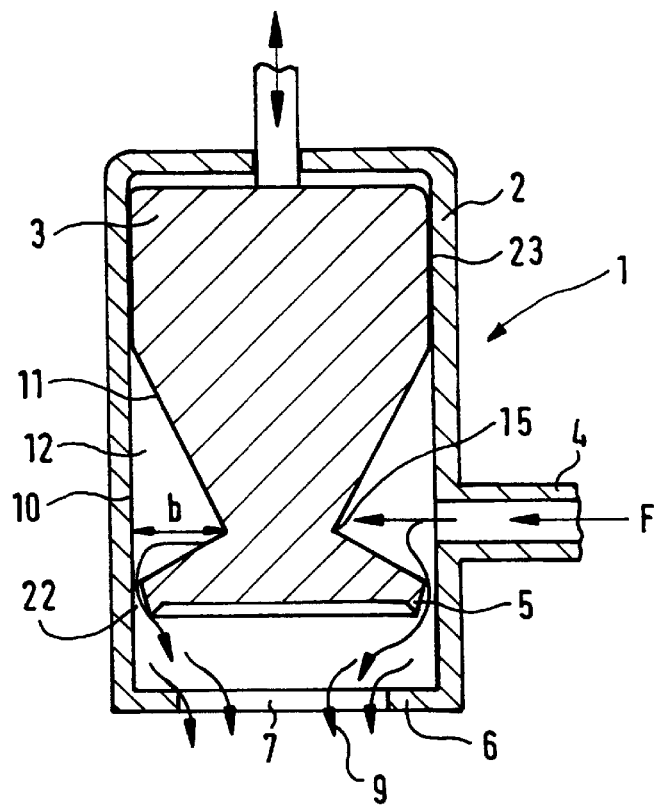

FIG. 2 shows the valve arrangement 1 according to the invention in the opened condition. Between the sealing section 5 of the closing element 3 and the inner side 10 of the valve housing 2 there is formed an annular gap 22 through which the fluid F reaches the outlet opening 7. The fluid F first collects in the distribution space 12 and after the opening of the closing element 3, exits uniformly distributed over the circumference of the closing element 3 through the annular gap 22. The width of the distribution space 12 continuously reduces, from the point of maximum width b in the region of the necking 15, towards the sealing section 5. With this, a uniform as possible discharge of the fluid F is guaranteed. The distribution space 12 extends towards the seal arrangement 5 which itself has a certain axial extension.

Essential to the invention is that with the valve still closed, the distribution space 12 is uniformly filled with fluid F, so that a uniform pressure builds up in the distribution space 12. On opening the valve arrangement 1, the fluid F exits through the outlet opening 7 under pressure which has the same magnitude over the whole circumference of the closing element 3. The delivered jet 9 of the fluid F thus, independently of the pressure and the viscosity of the fluid F, runs parallel to the axis of the valve arrangement 1.

FIGS. 3 and 4 show alternative embodiment examples of the distribution space 12. In FIG. 3 the distribution space 12 is formed by an indentation 16 on the inner side 10 of the valve housing 2. The indentation is formed by a curved surface of revolution 21 and by the outer surface of a cylindrical closing element 3. The outlet opening 7 is closed by the sealing action between the sealing section 5 and the valve seat 6. With the valve closed, the fluid enters into the the distribution space 12 similar as in FIG. 1, and here distributes uniformly.

In FIG. 4 a similar arrangement to that shown in FIG. 1 is shown. The necking 15, in contrast to that embodiment example shown in FIG. 1, is formed by a curved surface of revolution, typically a paraboloid of revolution. In both embodiment examples shown, the necking 15 or the indentation 16 defines the maximum width b of the distribution space 12. The width of the distribution space 12 continually reduces from the indentation 16 or the necking 15 towards the sealing section 5. The distribution space 12 extends up to the sealing section 5.

What is claimed is:

1. A valve arrangement for delivering highly viscous fluids, said valve arrangement comprising a valve housing having a cylindrical bore, a lateral inlet opening, an axial outlet opening, and a valve seat surrounding the outlet opening; and a closing element movably arranged within the bore, said closing element having:

a cylindrical section which is sealingly guided in said cylindrical bore, a sealing section adapted to seat against said valve seat so as to block fluid flow through said outlet, and a neck portion with a doubly tapered outer surface, said tapered outer surface being sized so as to define a rotationally symmetrical circumferential distribution space between said cylindrical bore and said tapered outer surface, said distribution space extending axially between the valve seat and the inlet opening and being in communication with the inlet opening when the valve is in a closed configuration, and having a radial width which continuously diminishes, from a point with a maximum radial width towards a point of minimum radial width at the sealing section, said radial width remaining constant when the sealing section is axially moved within said bore.

2. A valve arrangement according to claim 1, characterized in that the distribution space (12) is formed by two cone sections (20a, 20b) standing on one another.

3. A valve arrangement according to claim 1, characterized in that the distribution space (12) is formed by a curved surface of revolution (21).

4. A valve arrangement for highly viscous fluids, said valve comprising:

a housing having a cylindrical bore, a lateral inlet intersecting said bore and a coaxial outlet at one end of said bore, said outlet having a diameter less than that of the bore and being surrounded by a shoulder forming a flat annular seat having a surface perpendicular to said bore and a unitary closing element having (a) at one end a cylindrical portion sized to slide sealingly within said bore, (b) at the other end a sealing portion forming an annular gap with said bore and adapted to seal against said flat annular seat, and (c) a neck portion extending from said cylindrical portion to said sealing portion, said neck portion being of continuously varying diameter, thus defining a continuously varying radial clearance between the closing element and the housing, said radial clearance diminishing continuously from a point of maximum clearance, where the neck diameter is a minimum, to a point of minimum clearance at said sealing portion, whereby said fluid exits said outlet in an axial direction with no substantial radial component.

* * * * *